(12) United States Patent
Rabouh et al.

(10) Patent No.: US 11,577,323 B2
(45) Date of Patent: Feb. 14, 2023

(54) REPLACEABLE TOOL HEAD HAVING SERRATED COUPLING PORTIONS AND A TOOL HOLDER THEREFOR

(71) Applicant: ISCAR, LTD., Tefen (IL)

(72) Inventors: Rafi Rabouh, Neve Ziv (IL); Roman Fortfel, Carmiel (IL); Grigori Neiman, Kiryat Ata (IL); Daniel Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/341,897

(22) Filed: Jun. 8, 2021

(65) Prior Publication Data

US 2022/0001458 A1 Jan. 6, 2022

Related U.S. Application Data

(60) Provisional application No. 63/047,294, filed on Jul. 2, 2020.

(51) Int. Cl.
*B23B 27/16* (2006.01)
*B23B 1/00* (2006.01)
(Continued)

(52) U.S. Cl.
CPC .......... *B23B 27/16* (2013.01); *B23B 31/1075* (2013.01); *B23B 2240/00* (2013.01); *B23B 2260/132* (2013.01)

(58) Field of Classification Search
CPC ....... B23B 29/046; B23B 29/06; B23B 29/14; B23B 2260/132; B23B 2260/072;
(Continued)

(56) References Cited

U.S. PATENT DOCUMENTS 1,656,450 A * 1/1928 Steuer ................. B23B 31/1071
279/22
2,181,151 A * 11/1939 Reaney ................... B23B 27/16
407/96
(Continued)

FOREIGN PATENT DOCUMENTS

CN 104759646 A * 7/2015 ............ B23B 27/00
CN 106180773 8/2018
(Continued)

OTHER PUBLICATIONS

International Search Report dated Oct. 15, 2021, issued in PCT counterpart application (No. PCT/IL2021/050674).
(Continued)

*Primary Examiner* — Sara Addisu
(74) *Attorney, Agent, or Firm* — Womble Bond Dickinson (US) LLP

(57) ABSTRACT

A tool head has a longitudinal axis, forward and rearward ends, and top, bottom and peripheral surfaces. The peripheral surface has first and second side walls provided with respective first and second serrated portions, each of the first and second side walls being divided into spaced apart top and bottom side wall portions. The peripheral surface also has a stopper wall which faces in the rearward direction, extends transversely to the second side wall and is provided with a stopper serrated portion. A rear wall formed at the rearward end and connects the first and second side walls. The tool head also includes an insert retaining portion proximate the forward end, and a coupling portion which extends in the direction of the rearward end and includes vertically spaced apart top and bottom coupling arms separated by a coupling recess opening out to the rear wall.

25 Claims, 6 Drawing Sheets

(51) Int. Cl.
  *B23B 31/07* (2006.01)
  *B23B 31/107* (2006.01)

(58) Field of Classification Search
  CPC ............ B23B 2210/08; B23B 2205/02; B23B 2240/36; B23B 2270/06; B23B 2270/08; B23B 31/107; B23B 31/1075; B23B 2200/167; B23B 27/16; B23B 2240/00; B23C 5/226; B23C 5/2252; B23C 5/2278
  See application file for complete search history.

(56) References Cited

U.S. PATENT DOCUMENTS

| | | | | |
|---|---|---|---|---|
| 3,885,282 | A * | 5/1975 | Pataky | B23B 27/16 |
| | | | | 407/103 |
| 4,575,293 | A | 3/1986 | Berti | |
| 6,270,294 | B1 * | 8/2001 | Sjoo | B23B 27/045 |
| | | | | 407/101 |
| 6,736,574 | B2 * | 5/2004 | Persson | B23B 27/1681 |
| | | | | 407/85 |
| 6,960,049 | B2 * | 11/2005 | Inayama | B23B 27/08 |
| | | | | 407/103 |
| 7,240,594 | B2 | 7/2007 | Erickson et al. | |
| 7,246,974 | B2 * | 7/2007 | Hansson | B23B 27/04 |
| | | | | 409/107 |
| 8,549,965 | B2 | 10/2013 | Erickson | |
| 9,604,290 | B2 * | 3/2017 | Kisselbach | B23C 5/04 |
| 2009/0016830 | A1 * | 1/2009 | Nicholas | B23B 29/046 |
| | | | | 407/107 |
| 2009/0035075 | A1 * | 2/2009 | Hecht | B23B 27/007 |
| | | | | 407/104 |
| 2012/0260778 | A1 | 10/2012 | Uno | |
| 2020/0254528 | A1 * | 8/2020 | Lu | B23B 27/10 |

FOREIGN PATENT DOCUMENTS

| | | | | |
|---|---|---|---|---|
| CN | 209598226 | | 11/2019 | |
| DE | 102004033929 | | 1/2006 | |
| EP | 2082820 | A2 * | 7/2009 | ........... B23B 27/045 |
| JP | 2000225540 | A * | 8/2000 | ........... B23B 27/045 |
| JP | 2021037568 | A * | 3/2021 | |
| WO | WO-2005084947 | A1 * | 9/2005 | ............. B23B 27/10 |

OTHER PUBLICATIONS

Written Opinion dated Oct. 15, 2021, issued in PCT counterpart application (No. PCT/IL2021/050674).

* cited by examiner

REPLACEABLE TOOL HEAD HAVING SERRATED COUPLING PORTIONS AND A TOOL HOLDER THEREFOR

RELATED APPLICATIONS

The present application claims priority to U.S. Provisional Patent Application No. 63/047,294, filed Jul. 2, 2020. The contents of the aforementioned application are incorporated by reference in their entirety.

FIELD OF THE INVENTION

The subject matter of the present application relates to tool holders, in general, and to tool holders having separable tool heads carrying cutting tools, in particular.

BACKGROUND OF THE INVENTION

In the field of metal cutting, tool holders are known to have a cutter bar removably connected to a holder blade. A fastener is used to clamp a mounting surface of the holder blade between two inner walls of a groove of the cutter bar. Serrated surfaces are provided both on the inner walls of the groove and on the mounting surface. For example, such tools are disclosed in CN209598226 and CN106180773.

Also known are tool holders having a bolt passing across an end of the shank, allowing for assembly without removing the bolt. For example, such tools are disclosed in U.S. Pat. No. 4,575,293 and 7,240,594.

It is an object of the subject matter of the present application to provide tool holder having a quick removal mechanism while providing improved coupling between the tool head and the tool holder.

SUMMARY OF THE INVENTION

In accordance with a first aspect of the subject matter of the present application there is provided a tool head having a longitudinal tool head axis extending in a rearward to forward direction, comprising:
- a top surface, a bottom surface, and a peripheral surface extending therebetween, the peripheral surface further comprising:
  - a first side wall extending along the tool head axis and having a first serrated portion;
  - a second side wall located opposite the first side wall, relative to the tool head axis, in a top view of the tool head taken perpendicular to the top surface, the second side wall extending along the tool head axis and having a second serrated portion;
  - a stopper side wall, facing in the rearward direction and extending transversely to the second side wall, the stopper side wall including a stopper serrated portion; and
  - a rear wall extending between the first side wall and the second side wall, at a rearward end of the tool head;
- an insert seat located at an intersection of the top surface and the peripheral surface, at a forward end of the tool head; and
- a coupling recess located at the rearward end of the tool head, the coupling recess opening out to the rear wall, to the first side wall and to the second side wall.

In accordance with a second aspect of the subject matter of the present application there is provided a cutting tool comprising a tool holder, a tool head according to the present application, and a cutting insert mounted in the insert seat of the tool head.

BRIEF DESCRIPTION OF THE FIGURES

For a better understanding of the present application and to show how the same may be carried out in practice, reference will now be made to the accompanying drawings, in which.

Figure 1:
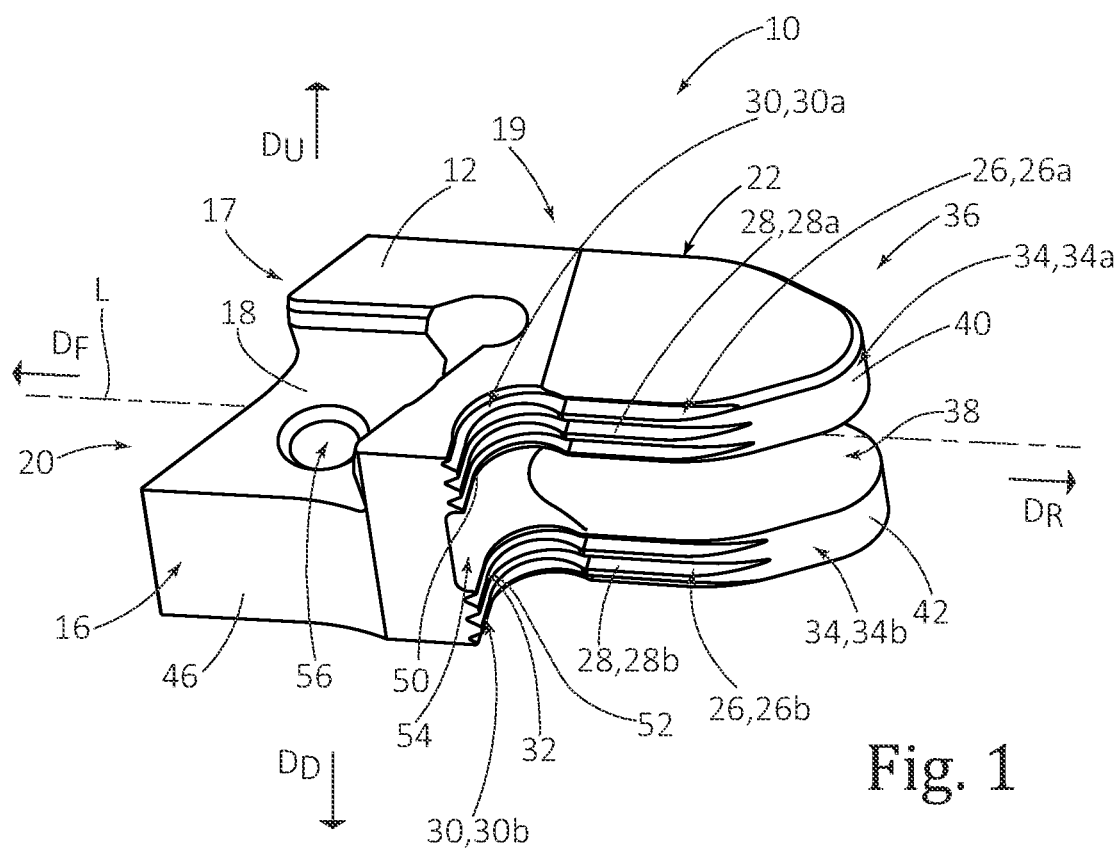
FIG. 1 is a first perspective view of a tool head, in accordance with the present application.
Figure 2:
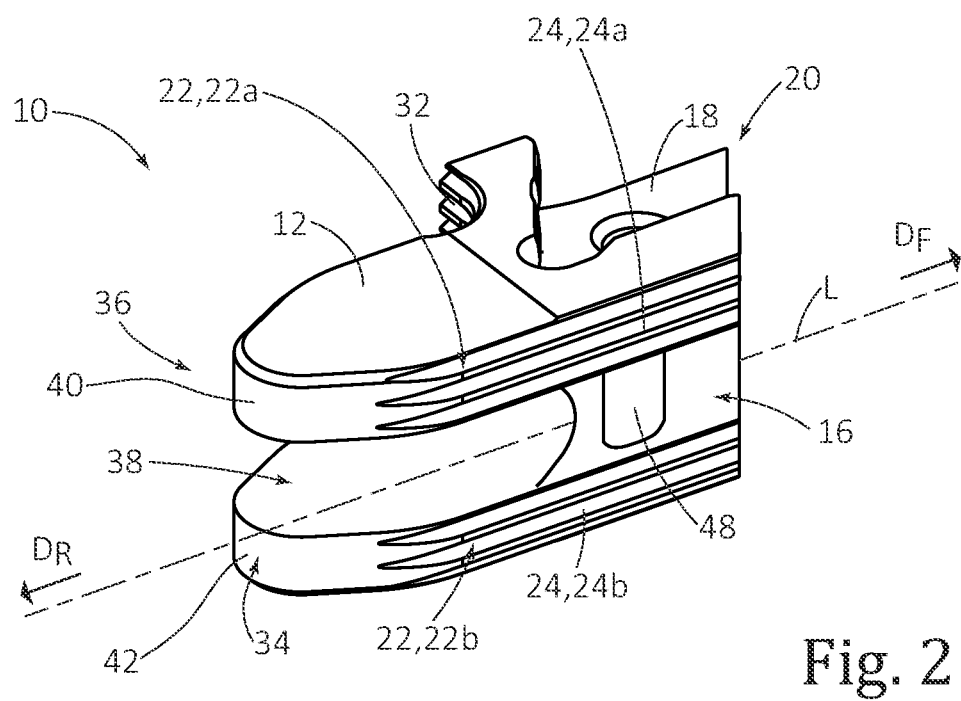
FIG. 2 is a second perspective view of the tool head of FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIGS. 1-5, showing a tool head 10 according to the present application. The tool head 10 has a longitudinal tool head axis L extending in a rearward to forward direction $D_R$, $D_F$ and a vertical tool head axis V perpendicular to the longitudinal tool head axis L and extending in an upward to downward direction $D_U$, $D_D$. The tool head 10 has a forward end 20 and a rearward end 36 located opposite the forward end 20 along the longitudinal tool head axis L.

The tool head 10 includes a top surface 12, a bottom surface 14, and a peripheral surface 16 extending therebetween. The vertical tool head axis V passes in a generally perpendicular direction through the top surface 12 and the bottom surface 14.

The peripheral surface 16 further includes a first side wall 22 extending along the tool head axis L and having a first serrated portion 24. A second side wall 26 is located opposite of the first side wall 22, relative to the tool head axis L, in a top view of the tool head 10, taken perpendicular to the top surface 12. The second side wall 26 extends along the tool head axis L and has a second serrated portion 28 thereon.

A stopper wall 30 faces in the rearward direction $D_R$ and extends transversely to the second side wall 26. The stopper wall 30 includes a stopper serrated portion 32 thereon. A rear wall 34 of the tool head 10 extends between the first side wall 22 and the second side wall 26, at a rearward end 36 of the tool head 10.

The tool head 10 further comprises an insert retaining portion 17 proximate the forward end 20 and a coupling portion 19 connected to the insert retaining portion 17 and extending rearwardly in the direction of the rearward end 36 of the tool head 10.

The insert retaining portion 17 includes an insert seat 18, located at an intersection of the top surface 12 and the peripheral surface 16, at the forward end 20 of the tool head 10.

The insert seat may have a screw bore 56 opening out to the insert seat 18.

The screw bore 56 may be extending toward the bottom surface 14.

The coupling portion 19 comprises a rearwardly extending top coupling arm 40 and a rearwardly extending bottom coupling arm 42, spaced apart from one another along the vertical axis V by a coupling recess 38 opening out to the rear wall 34 located at the rearward end 36 of the tool head 10.

The first side wall 22 is divided into spaced apart top and bottom first side wall portions 22a, 22b, each side wall portion being at least partially formed on a corresponding top or bottom coupling arm 40, 42. The second side wall 26 is divided into spaced apart top and bottom second side wall portions 26a, 26b, each side wall portion being at least partially formed on a corresponding top or bottom coupling arm 40, 42. The first serrated portion 24 formed on the first side wall 22 thus comprises top and bottom serrated first side wall sections 24a, 24b at least partially formed on a corresponding top or bottom coupling arm 40, 42. Similarly, the second serrated portion 28 formed on the second side wall 26 has top and bottom serrated second side wall sections 28a, 28b at least partially formed on a corresponding top or bottom coupling arm 40, 42.

The stopper wall 30 may be divided into top and bottom stopper portions 30a, 30b, each stopper portion may be at least partially formed on a corresponding top or bottom coupling arm 40, 42. Thus, the stopper serrated portion 32 is divided into top and bottom stopper serrated sections 50, 52.

The rear wall 34 is divided by the coupling recess 38 into top and bottom rear wall portions 34a, 34b formed on corresponding top and bottom coupling arms 40, 42. Thus, the coupling recess 38 opens out to the rear wall 34, to the first side wall 22 and to the second side wall 26, thereby forming the spaced apart top coupling arm 40 and bottom coupling arm 42.

Figure 4:
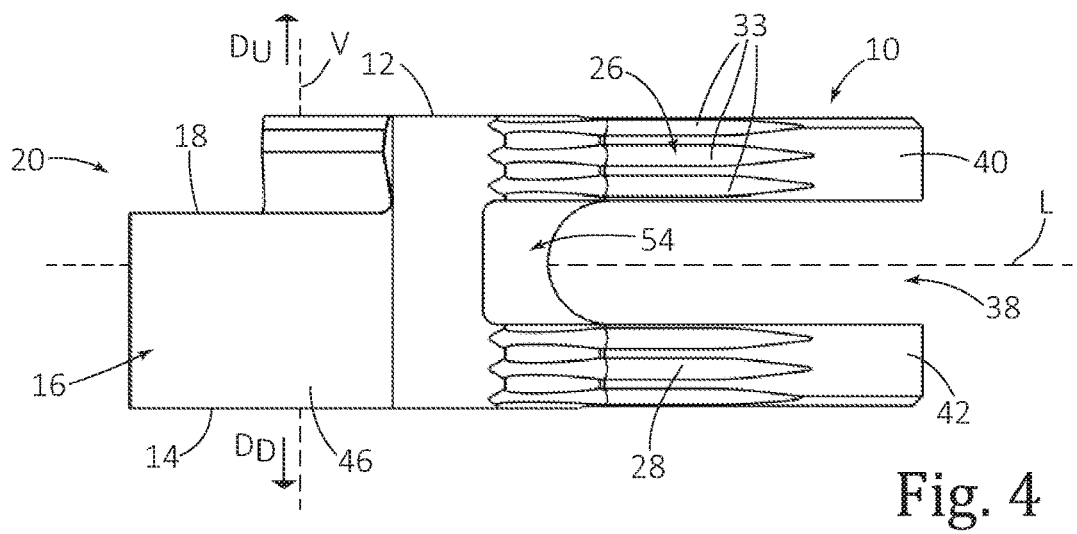
FIG. 4 is a first side view of the tool head of FIG. 1, taken as per the view IV of FIG. 3.
Figure 5:
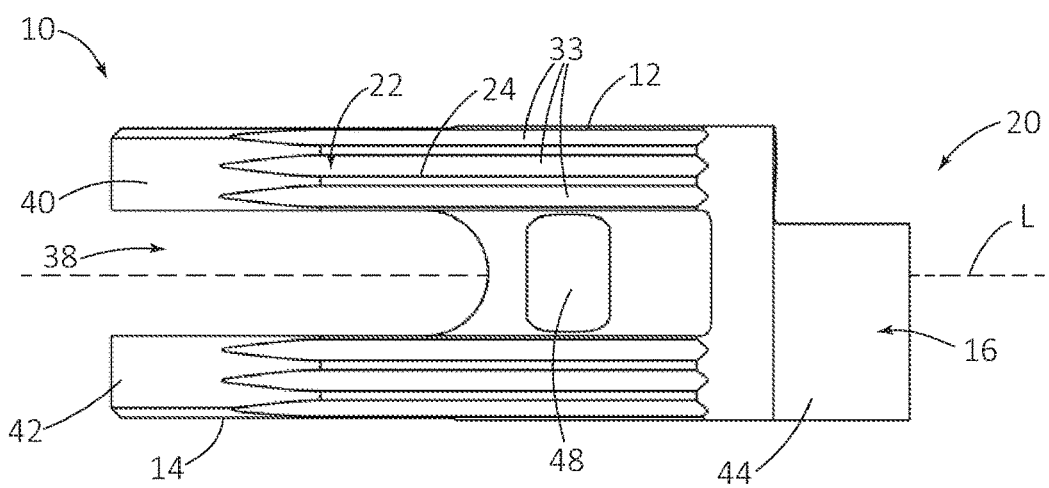
FIG. 5 is a second side view of the tool head of FIG. 1, taken as per the view V of FIG. 3.

As best seen in FIGS. 4 and 5, the first serrated portion 24 and the second serrated portion 28 each comprise a plurality of serration grooves 33 which run in a direction parallel to the longitudinal tool head axis L. The stopper serrated portion 32 also comprises a plurality of serration grooves which run transverse to the longitudinal tool head axis L and transverse to the vertical tool head axis V.

Figure 3:
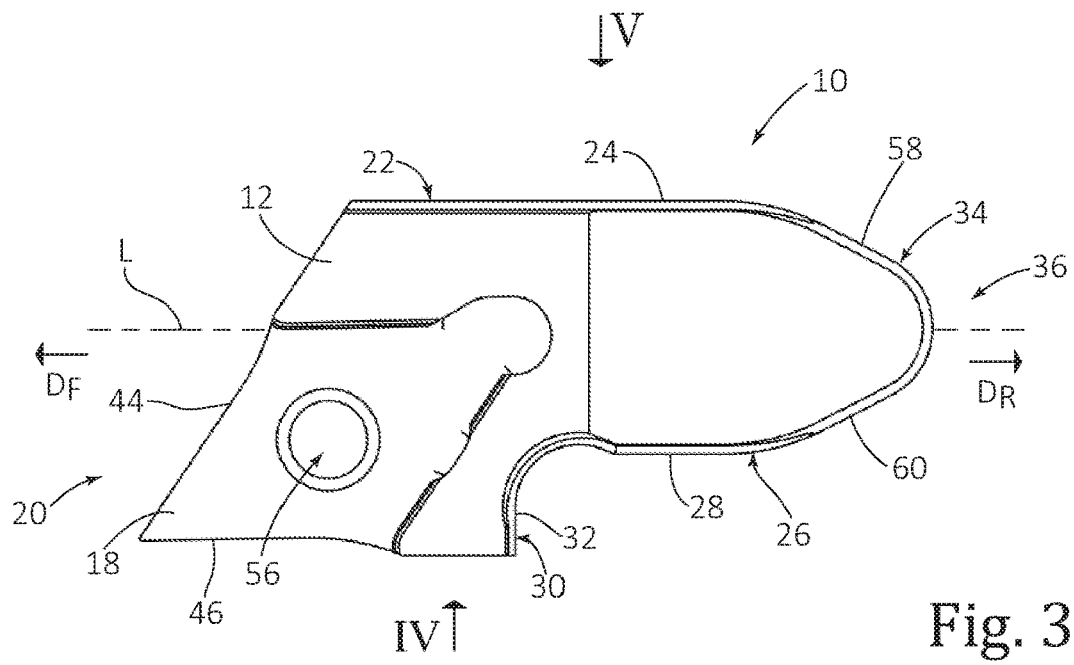
FIG. 3 is a top view of the tool head of FIG. 1.

As shown in FIGS. 3 and 5, the peripheral surface 16 includes a front wall 44 at the forward end 20 of the tool head 10. A forward support wall 46 extends from the front wall 44 in the rearward direction $D_R$.

In some embodiments of the present invention, the insert seat 18 is located at an intersection of the top surface 12 with the front wall 44 and the forward support wall 46.

In some embodiments of the present invention, as shown in FIGS. 1-9, the rear wall 34 of the coupling portion 19 of the tool head 10 is devoid of serrations.

Attention is now drawn to FIGS. 6-9, showing a cutting tool 100, in accordance with an embodiment of the present application. The cutting tool 100 includes a tool holder 102, the tool head 10, and a cutting insert 62 mounted in the insert seat 18 of the tool head 10. The tool holder 102 has a longitudinal holder axis H extending in the rearward to forward direction $D_R$, $D_F$, and a tool head receiving portion 104, located at a holder forward end 106 of the tool holder 102.

The tool head receiving portion 104 has a holder stopper wall 118 facing in the forward direction $D_F$ and having a tool holder stopper serrated portion 120 thereon. The tool head receiving portion 104 further includes a first clamping arm 108 and a second clamping arm 110. The first clamping arm 108 and the second clamping arm 110 are located on opposite sides of the holder axis H, and are spaced apart by a tool head receiving pocket 112.

The first clamping arm 108 has a first internal serrated portion 114 facing the tool head receiving pocket 112 and a through bore 122 extending transversely to the holder axis H. The second clamping arm 110 has a second internal serrated portion 116 facing the tool head receiving pocket 112 and a threaded bore 124 extending transversely to the holder axis H. The threaded bore 124 and the through bore 122 extend along a common lateral axis M.

Figure 6:
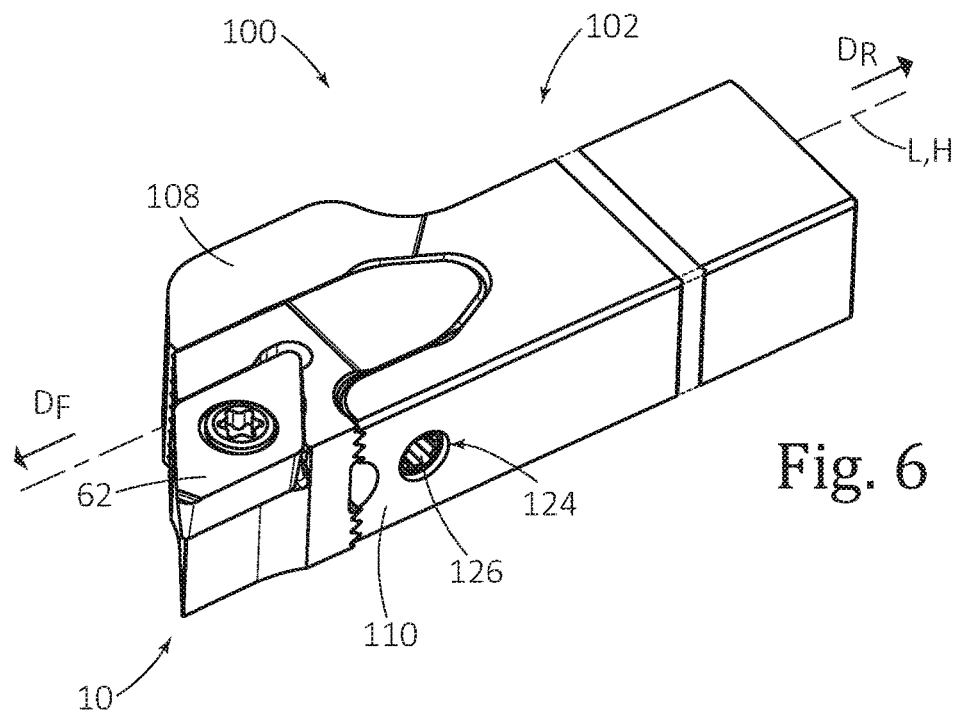
FIG. 6 is a perspective view of a cutting tool in accordance with the present application.
Figure 7:
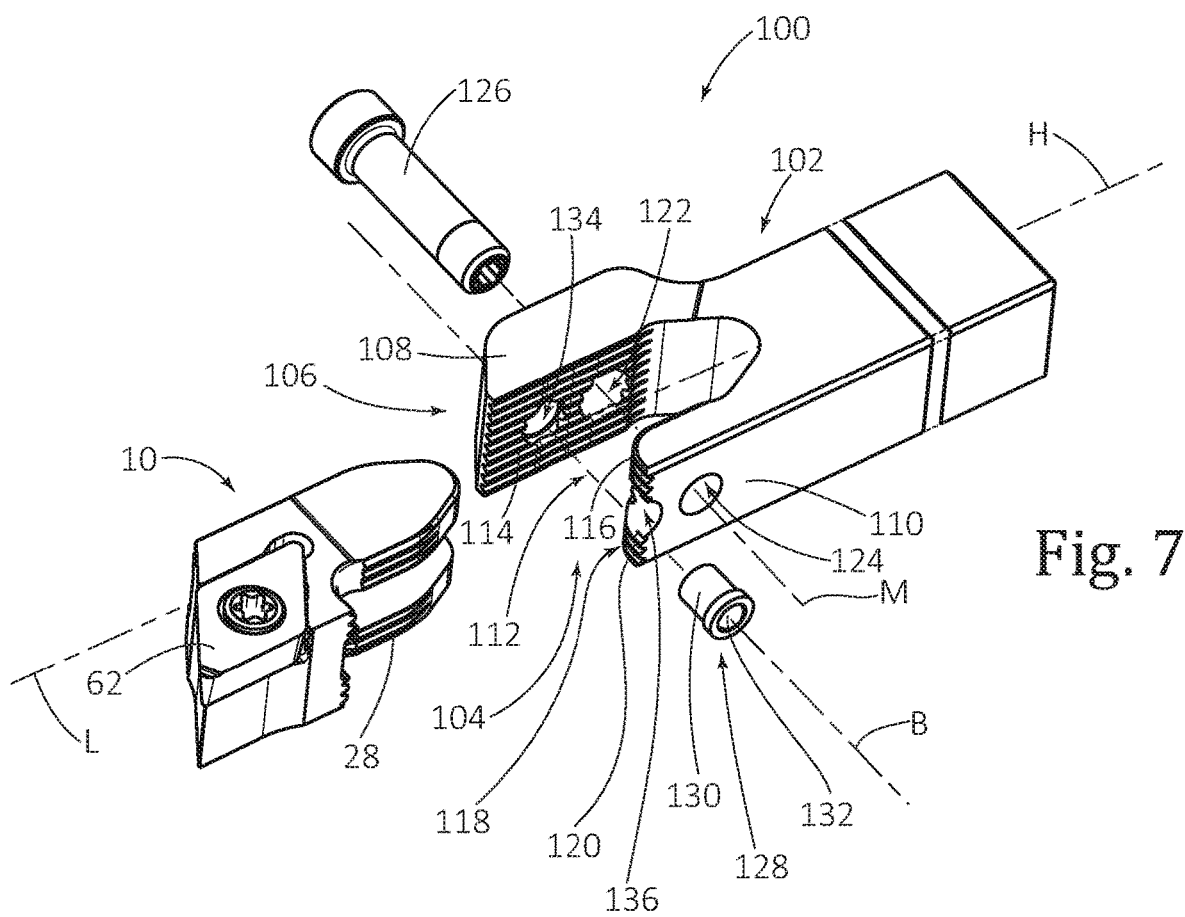
FIG. 7 is an exploded view of the cutting tool of FIG. 6.
Figure 8:
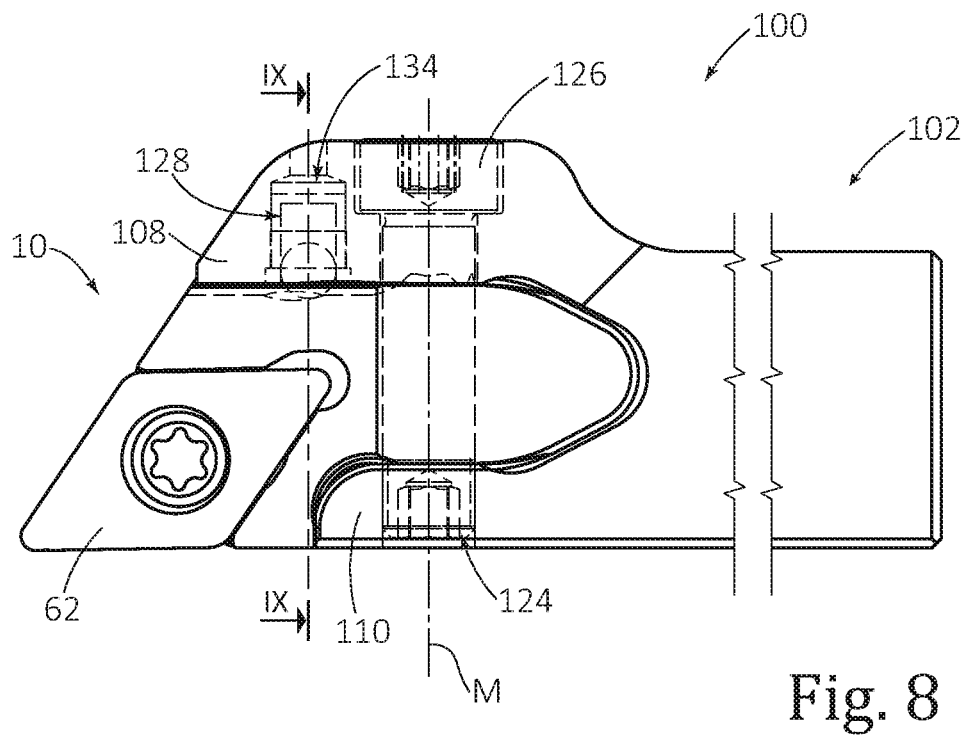
FIG. 8 is a top view of the cutting tool of FIG. 6.
Figure 9:
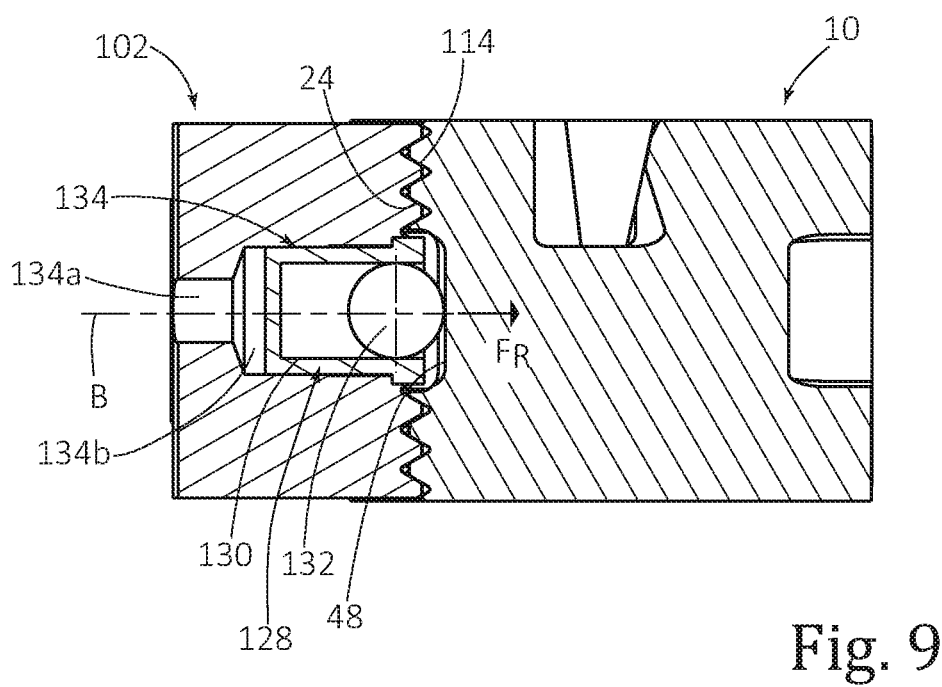
FIG. 9 is a cross sectional view of the cutting tool of FIG. 6, taken along the lines IX-IX of FIG. 8.

As shown in FIGS. 6, 8 and 9, the tool head 10 is coupled with the tool holder 102. For this, the tool head 10 is placed in front of the tool head receiving portion 104 (as in FIG. 7), and moved in the rearward direction $D_R$ along the holder axis H. In other words, the tool head 10 slidingly engages the tool head receiving portion 104.

As the tool head 10 is inserted in the tool head receiving portion 104, the tool head's first serrated portion 24 interacts with the tool holder's first internal serrated portion 114, the tool head's second serrated portion 28 interacts with the tool holder's second internal serrated portion 116 and the tool head's stopper serrated portion 32 interacts with the tool holder stopper serrated portion 120. Such tool coupling provides serrated surface interaction between the tool holder 102 and the tool head 10, along multiple surfaces thereof, including at their respective stopper walls 30, 118. The serrated surface coupling prevents relative movement between the tool holder 102 and the tool head 10, in a direction transverse to the serrations, such as in the upward to downward direction $D_U$, $D_D$.

A clamping member 126 passes through the through bore 122 of the first clamping arm 108 and partially interacts with the threaded bore 124 of the second clamping arm 110. The clamping member 126 is also received within the coupling recess 38 of the tool head 10.

It is noted, that the coupling recess 38 provides a degree of flexibility for movement of the top coupling arm 40 and the bottom coupling arm 42 in a direction perpendicular to the tool head axis L. Thus, as the tool head 10 is advanced into the tool head receiving portion 104, the top and bottom coupling arms 40, 42 may move in the direction perpendicular to the tool head axis L, allowing for smooth coupling between the tool head's first serrated portion 24 and the tool holder's first internal serrated portion 114, and also between the tool head's second serrated portion 28 and the tool holder's second internal serrated portion 116.

The clamping member 126 may be inserted into the through bore 122 and the threaded bore 124, before the tool head 10 is inserted into the tool head receiving portion 104. In such a case, the coupling recess 38 passes over the clamping member 126. More specifically, the tool head's top and bottom coupling arms 40, 42 pass on either side of (e.g., above and below, respectively) the clamping member 126.

Alternatively, the clamping member 126 may be inserted into the through bore 122 and the threaded bore 124, after the tool head 10 is inserted into the tool head receiving portion 104. In such a case, the clamping member 126 slides through the coupling recess 38, along the lateral axis M.

As the clamping member 126 is threadedly engaged in the threaded bore 124, the first clamping arm 108 and the second clamping arm 110 are pulled toward one another, thereby pressing against the tool head 10, and clamping it.

The interaction between the tool head's first serrated portion 24 with the tool holder's first internal serrated portion 114, and the interaction between the tool head's second serrated portion 28 with the tool holder's second internal serrated portion 116, forms contact between the tool head 10 and the tool holder 102, along repeatable and multiple contact surfaces. Similarly, this applies to the interaction between the tool head's stopper serrated portion 32 with the tool holder stopper serrated portion 120.

In some embodiments, the tool head's stopper serrated portion 32 is provided proximate to the insert seat 18. The tool holder stopper serrated portion 120 is provided at a forward end of the second clamping arm 110, forming repeatable contact in proximity to the insert seat 18. The serrated contact along the stopper wall 30 supports the tool head 10 during cutting operations, countering the machining forces which are applied on the cutting insert 62.

It would be appreciated, that the clamping member 126 is received within the coupling recess 38 without contacting the tool head 10. Therefore, when the clamping member 126 is partly unthreaded from the threaded bore 124, the first and second clamping arms 108, 110 no longer clamp the tool head 10. In this state, the tool head 10 may be removed from the tool holder 102, without completely removing the clamping member 126. Similarly, and as noted above, the tool head 10 may be mounted into the tool holder 102, when the clamping member 126 is already partly threaded into the threaded bore 124. This provides a quick-release, or quick-change, mechanism for coupling the tool head 10 with the tool holder 102.

Such modular quick-change configuration, as disclosed in the present application, encompasses the advantage of using the same tool holder 102, with different tool heads 10, while the tool holder remains connected to the machine. The different tool heads 10 may have various cutting configurations of the cutting insert, not limited to the one shown in the drawings. That is, different tool heads 10 may have different insert pocket structures, for carrying different cutting inserts and performing different cutting operations. This provides a modular cutting tool allowing a variety of cutting operations to be performed with the same tool holder still connected to the machine.

With further reference to FIGS. 2, 3 and 7-9, in some embodiments of the present invention, the first side wall 22 of the tool head 10 has a side recess 48 thereon, located axially forward of the coupling recess 38. The first clamping arm 108 of the cutting tool 100, has a retention bore 134 passing there through, and opening out to the first internal serrated portion 114. The retention bore 134 extends along a retention bore axis B, transverse to the holder axis H.

A retention member 128 is inserted into the retention bore 134. When the tool head 10 is mounted in the tool head receiving pocket 112, the side recess 48 faces the retention bore 134, and thus faces the retention member 128.

In some embodiments, the retention member 128 includes a housing 130 and a spring loaded spherical member 132. As seen in FIG. 9, the retention bore 134 may comprise a narrow neck portion 134a connected to an enlarged body portion 134b which is configured and dimensioned to receive the housing 130 of the retention member 128. As shown particularly in FIGS. 8-9, the spherical member 132 is urged by the spring (not shown) into the tool head's side recess 48. In this manner, the spherical member 132 applies a retention force $F_R$ on the tool head 10, along the retention bore axis B. The tool head 10 is thus pressed against the second clamping arm 110 of the tool holder 102.

Due to the force applied by the spherical member 132, the tool head 10 is held in place inside the tool head receiving pocket 112, even when the clamping member 126 is not fully threaded in the threaded bore 124. In this manner, the retention member 128 is used to retain the tool head 10 and prevent it from falling out by sliding out of the tool holder 102 along the holder axis H, even when not fully clamped by the clamping member 126. Such falling prevention mechanism is particularly advantageous when the forward direction $D_F$ is as the gravitational direction, i.e., downwards.

In some embodiments, the retention bore 134 is located forward of the through bore 122, along the holder axis H.

In some embodiments of the present invention, the stopper serrated portion 32 of the tool head 10 may have a top stopper serrated section 50 extending along the top surface 12, and a bottom stopper serrated section 52 extending along the bottom surface 14. The bottom stopper serrated section 52 is spaced apart from the top stopper serrated section 50 by a stopper wall indent 54. The stopper wall indent 54 has no serrations thereon. This ensures spaced apart, split contact areas between the tool head's stopper serrated portion 32 and the tool holder stopper serrated portion 120.

Further, the holder stopper wall 118 of the tool holder 102 may have a holder stopper recess 136, separating the tool holder stopper serrated portion 120 into two spaced apart portions. This forms free space for insertion of the retention member 128 into the retention bore 134. That is, the holder stopper recess 136 provides uninterrupted access to the retention bore 134, along the retention bore axis B (FIG. 7), so that the retention member 128 may be inserted in a straight line into the retention bore 134.

In some embodiments of the present invention, as indicated for example in FIG. 3 and FIG. 8, the rear wall 34 of the tool head 10 has a V-shape, including a first rear wall portion 58 and a second rear wall portion 60, which converge in the rearward direction $D_R$. This may allow for easier insertion of the tool head 10 into the tool head receiving pocket 112, since the tool head 10 is slidingly led into the tool head receiving pocket 112, with no sharp edges at its rearward end 36.

Figure 10A:
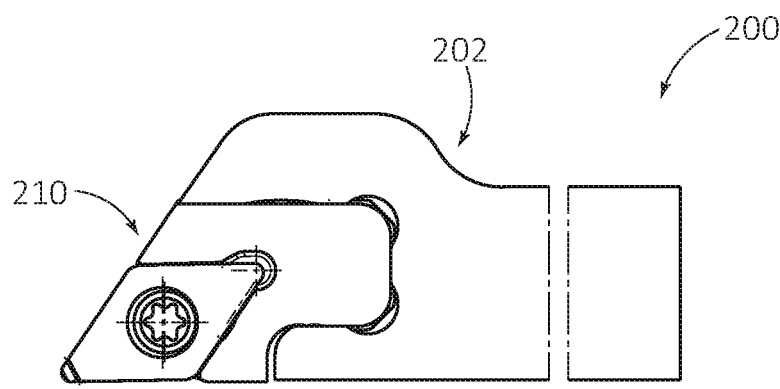
FIG. 10A is an elevated view of a cutting tool in accordance with another embodiment of the present application.
Figure 10B:
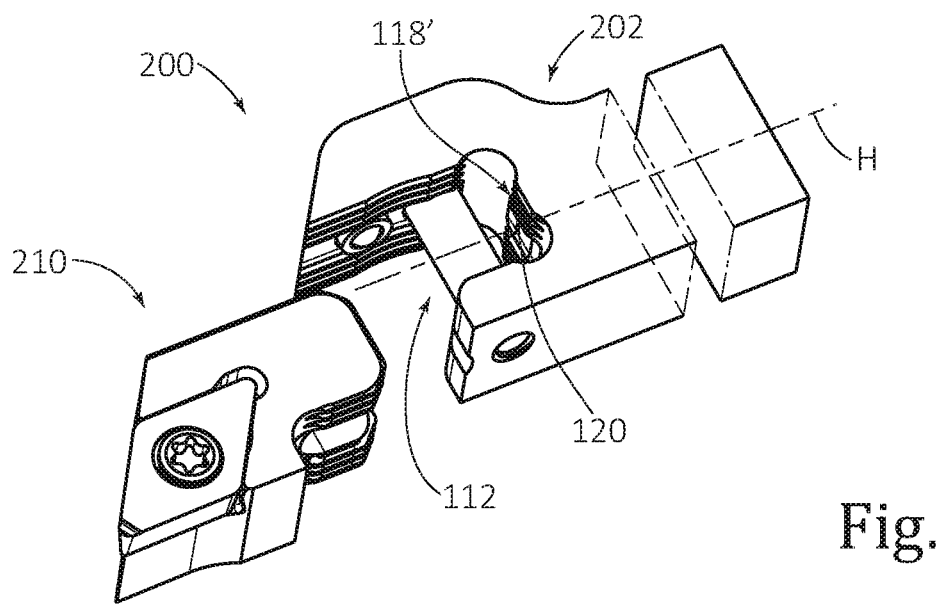
FIG. 10B is an exploded view of the cutting tool of FIG. 10A.
Figure 10C:
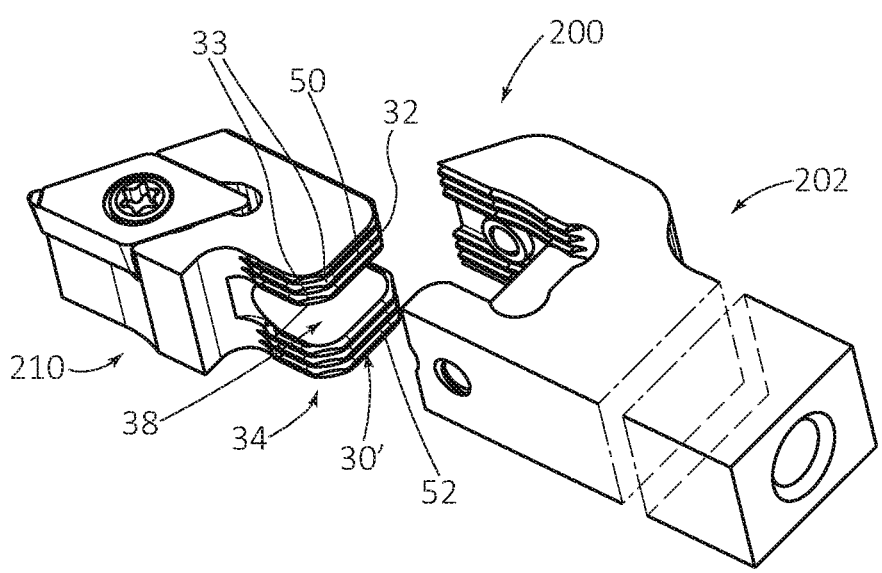
FIG. 10C is another exploded view of the cutting tool of FIG. 10A.

Attention is now drawn to FIGS. 10A, 10B and 10C, depicting a cutting tool 200 according to another embodiment of the present application. The cutting tool 200 includes a tool holder 202 and a tool head 210. The tool holder 202 is similar to the tool holder 102, except for the position of the holder stopper wall. In this embodiment, the holder stopper wall 118' is located at an inner (rearward) end of the tool head receiving pocket 112.

The tool head 210 is similar to tool head 10, except for the position of the stopper wall. In this embodiment, the stopper wall 30' is located on the rear wall 34 of the tool head 210. In this case, the stopper serrated portion 32 comprises a plurality of serration grooves 33 (formed on the rear wall 34) which run in a direction perpendicular to the tool head longitudinal axis L and to the vertical tool head axis V. Furthermore, as seen in FIG. 10C, the stopper serrated portion 32 is located between the first serrated portion 24 and the second serrated portion 28 on both the top and bottom coupling arms 40, 42. Also in this embodiment, the top and bottom stopper serrated sections 50, 52 are vertically spaced apart from one another by the coupling recess 38.

The coupling of the tool head 210 with the tool holder 202 is similar to the coupling described herein above with regard to tool head 10 and tool holder 102. The difference being that the interaction between the tool head's stopper serrated portion 32 and the tool holder stopper serrated portion 120 occurs at the inner (rearward) end of the tool head receiving pocket 112. In practice, this embodiment is an alternative to the embodiment shown in FIGS. 1-9, resulting at the same technical result of tool coupling, by maintaining serrated surface interaction between the tool holder 202 and the tool head 210 also at their stopper surfaces.

Figure 11A:
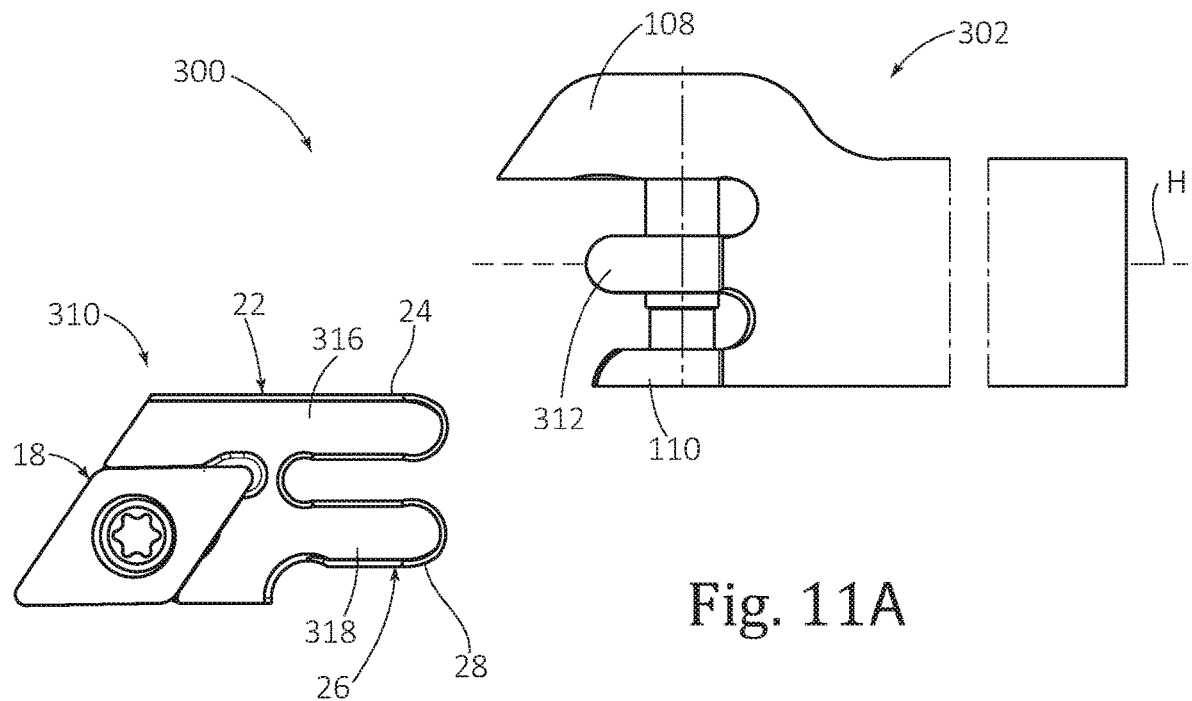
FIG. 11A is a top exploded view of a cutting tool in accordance with a further embodiment of the present application.
Figure 11B:
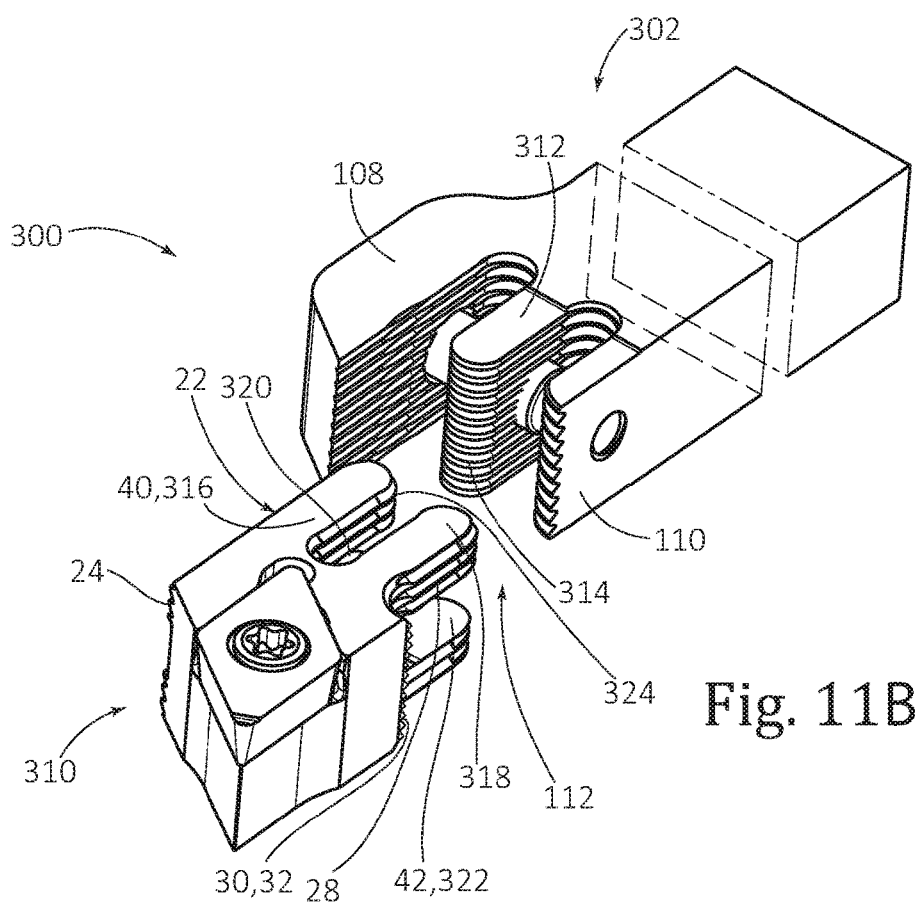
FIG. 11B is an elevated exploded view of the cutting tool of FIG. 11A.

Attention is further drawn to FIGS. 11A and 11B, showing a cutting tool 300 according to yet another embodiment of the present application. The cutting tool 300 includes a tool holder 302 and a tool head 310. Compared to the tool holder 102, the tool holder 302 further includes a center clamping arm 312 located between the first clamping arm 108 and the second clamping arm 110. The center clamping arm 312 extends longitudinally in the forward direction $D_F$ from the inner (rearward) end of the tool head receiving pocket 112. The center clamping arm 312 has a holder center serrated portion 314.

In the tool head 310, the top coupling arm 40 is divided into a first top coupling arm portion 316 and a second top coupling arm portion 318, spaced apart from one another. Likewise, the bottom coupling arm 42 is divided into a first bottom coupling arm portion 320 and a second bottom coupling arm portion 322, spaced apart from one another. The coupling arm portions 316, 318, 320 and 322 have a tool head central serrated portion 324.

The coupling of the tool head 310 with the tool holder 302 is similar to the coupling described herein above with regard to tool head 10 and tool holder 102, i.e., in the following manner. The tool head 310 is inserted into the tool head receiving pocket 112 along the holder axis H, in the rearward direction $D_R$. The center clamping arm 312 of the tool holder 302 is received in the space between the first top coupling arm portion 316 and the second top coupling arm portion 318, and also between the first bottom coupling arm portion 320 and the second bottom coupling arm portion 322.

The holder center serrated portion 314 of the tool holder 302 interacts with the tool head central serrated portion 324 of the tool head 310. This provides a strong coupling between the tool head 310 and the tool holder 302, due to enlarged serrated contact area there between.

Although the subject matter of the present application has been described to a certain degree of particularity, it should be understood that various alterations and modifications could be made without departing from the spirit or scope of the invention as hereinafter claimed.

What is claimed is:

1. A tool head (10, 210, 310) having a longitudinal tool head axis (L) extending in a rearward to forward direction (DR, DF), a vertical tool head axis (V) perpendicular to the longitudinal tool head axis (L) and extending in an upward to downward direction (DU, DD), a forward end (20), and a rearward end (36) located opposite the forward end (20); the tool head (10, 210, 310) comprising:
    a top surface (12), a bottom surface (14), and a peripheral surface (16) extending therebetween, the peripheral surface (16) comprising:
        first and second side walls (22, 26) located on opposite sides of the longitudinal tool head axis (L) in a top view of the tool head (10), the first side wall (22) having a first serrated portion (24) and the second side wall (26) having a second serrated portion (28);
        a stopper wall (30, 30') facing in the rearward direction (DR) and extending transversely to the second side wall (26), the stopper wall (30) having a stopper serrated portion (32); and
        a rear wall (34) extending between the first side wall (22) and the second side wall (26), at the rearward end (36) of the tool head (10);
    an insert retaining portion (17) comprising an insert seat (18) located at an intersection of the top surface (12) and the peripheral surface (16); and
    a coupling portion (19) connected to the insert retaining portion (17) and comprising rearwardly extending top and bottom coupling arms (40, 42) which are spaced apart from one another along the vertical axis (V) by a coupling recess (38) which opens out to the rear wall (34) at the rearward end (36).

2. The tool head (10, 210, 310) according to claim 1, wherein:
    the first side wall (22) is divided into vertically spaced apart top and bottom first side wall portions (22a, 22b), each first side wall portion being at least partially formed on a corresponding top or bottom coupling portion (40, 42);
    the first serrated portion (24) is divided into top and bottom serrated first side wall sections (24a, 24b) which are at least partially formed on corresponding top and bottom coupling arms (40, 42);
    the second side wall (26) is divided into vertically spaced apart top and bottom second side wall portions (26a, 26b), each second side wall portion being at least partially formed on a corresponding top or bottom coupling portion (40, 42); and
    the second serrated portion (28) is divided into top and bottom serrated second side wall sections (28a, 28b) which are at least partially formed on corresponding top and bottom coupling arms (40, 42).

3. The tool head (10, 210, 310) according to claim 1, wherein the coupling recess (38) opens out to the rear wall (34), to the first side wall (22) and to the second side wall (26), thereby forming the spaced apart top and bottom coupling arms (40, 42).

4. The tool head (10, 210, 310) according to claim 1, wherein:
    each of the first serrated portion (24) and the second serrated portion (28) comprises a plurality of serration grooves (33); and the serration grooves (33) of the first serrated portion (24) and the serration grooves (33) of the second serrated portion (28) run in a direction parallel to the longitudinal tool head axis (L).

5. The tool head (10, 210, 310) according to claim 4, wherein:
the stopper serrated portion (32) comprises a plurality of serration grooves (33); and
the serration grooves (33) of the stopper serrated portion (32) run in a direction transverse to the longitudinal tool head axis (L).

6. The tool head (10, 210, 310) according to claim 1, wherein:
the rear wall (34) extends between the first side wall (22) and the second side wall (26) at the rearward end (36) of the tool head (10); and
the rear wall (34) is divided by the coupling recess (38) into top and bottom rear wall portions (34a, 34b) formed on corresponding top and bottom coupling arms (40, 42).

7. The tool head (210) according to claim 6, wherein:
the stopper serrated portion (32) is formed on the rear wall (34) and comprises a plurality of serration grooves (33); and
the serration grooves (33) of the stopper serrated portion (32) run in a direction perpendicular to the longitudinal tool head axis (L).

8. The tool head (10, 210, 310) according to claim 1, wherein:
the stopper serrated portion (32) has a top stopper serrated section (50) extending along the top surface (12), and a bottom stopper serrated section (52) extending along the bottom surface (14), and
the bottom stopper serrated section (52) is spaced apart from the top stopper serrated section (50) by the coupling recess (38).

9. The tool head (10, 310) according to claim 1, wherein:
the stopper serrated portion (32) has a top stopper serrated section (50) extending along the top surface (12), and a bottom stopper serrated section (52) extending along the bottom surface (14), and
the bottom stopper serrated section (52) is spaced apart from the top stopper serrated section (50) by a stopper wall indent (54).

10. The tool head (10, 210, 310) according to claim 1, wherein the insert retaining portion (17) further comprises an insert seat screw bore (56) opening out to the insert seat (18) and extending toward the bottom surface (14).

11. The tool head (10, 210, 310) according to claim 1, wherein the first side wall (22) includes a side recess (48) located axially forward of the coupling recess (38).

12. The tool head (10, 210, 310) according to claim 1, wherein:
the peripheral surface (16) further comprises:
a front wall (44) at the forward end (20) of the tool head (10), and
a forward support wall (46) extending from the front wall (44) in the rearward direction (DR); and
the insert seat (18) is located at an intersection of the top surface (12) with the front wall (44) and the forward support wall (46).

13. The tool head (10) according to claim 1, wherein the rear wall (34) includes a first rear wall portion (58) and a second rear wall portion (60), converging in the rearward direction (DR).

14. The tool head (10) according to claim 1, wherein the rear wall (34) is devoid of serrations.

15. The tool head (10) according to claim 1, wherein the stopper wall (30) is located adjacent to, and forward of, the second side wall (26).

16. The tool head (210) according to claim 1, wherein the stopper wall (30') is located on the rear wall (34) of the tool head (210).

17. The tool head (310) according to claim 1, wherein:
the top coupling arm (40) is divided into a first top coupling arm portion (316) and a second top coupling arm portion (318) which are spaced apart from one another; and
the bottom coupling arm (42) is divided into a first bottom coupling arm portion (320) and a second bottom coupling arm portion (322) which are spaced apart from one another.

18. A cutting tool (100, 200, 300), comprising:
a tool holder (102, 202, 302);
a tool head (10, 210, 310) in accordance with claim 1 mounted on the tool holder; and
a cutting insert (62) mounted in the insert seat (18) of the tool head (10, 210, 310).

19. The cutting tool (100, 200, 300), according to claim 18, wherein:
the tool holder (102, 202, 302) has a longitudinal holder axis (H) extending in the rearward to forward direction (DR, DF), and a tool head receiving portion (104) located at a holder forward end (106) of the tool holder (102, 202, 302), the tool head receiving portion (104) comprising:
a first clamping arm (108) and a second clamping arm (110), located on opposite sides of the holder axis (H), and spaced apart by a tool head receiving pocket (112);
the first clamping arm (108) having a through bore (122) extending transversely to the holder axis (H) and a first internal serrated portion (114) facing the tool head receiving pocket (112);
the second clamping arm (110) having a threaded bore (124) extending transversely to the holder axis (H) and a second internal serrated portion (116) facing the tool head receiving pocket (112); and
a holder stopper wall (118, 118') facing in the forward direction (DF) and having a holder stopper serrated portion (120);
wherein the tool head (10) is mounted in the tool head receiving portion (104), such that:
the first serrated portion (24) interacts with the first internal serrated portion (114),
the second serrated portion (28) interacts with the second internal serrated portion (116),
the stopper serrated portion (32) interacts with the holder stopper serrated portion (120), and
a clamping member (126) passes through the through bore (122) of the first clamping arm (108), received within the coupling recess (38) of the tool head (10), and interacts with the threaded bore (124) of the second clamping arm (110).

20. The cutting tool (100, 200, 300) according to claim 19, wherein:
the first clamping arm (108) has a retention bore (134) passing therethrough and opening out to first internal serrated portion (114);
the cutting tool (100, 200, 300) further comprises a retention member (128) inserted into the retention bore (134), the retention member (128) pressing against a side recess (48) of the tool head (10, 210, 310).

21. The cutting tool (100, 200, 300) according to claim 20, wherein the retention member (128) includes a housing (130) and a spherical member (132), the spherical member (132) being spring loaded in the housing (130), and pressing against the side recess (48) of the tool head (10, 210, 310).

22. The cutting tool (100, 200, 300) according to claim 20, wherein the retention bore (134) is located axially forward of the through bore (122), along the holder axis (H).

23. The cutting tool (100) according to claim 19, wherein the holder stopper wall (118) of the tool holder (102) has a holder stopper recess (136), separating the holder stopper serrated portion (120) into two spaced apart portions.

24. The cutting tool (200) according to claim 19, wherein:
- the stopper wall (30') is located on the rear wall (34) of the tool head (210); and
- the holder stopper wall (118') is located at an inner end of the tool head receiving pocket (112).

25. The cutting tool (300) according to claim 19, wherein:
- the tool holder (302) further includes a center clamping arm (312) located between the first clamping arm (108) and the second clamping arm (110), the center clamping arm (312) extending in the forward direction (DF) from a rearward end of the tool head receiving pocket (112);
- the tool head's top coupling arm (40) is divided into a first top coupling arm portion (316) and a second top coupling arm portion (318) which are spaced apart from one another; and
- the tool head's bottom coupling arm (42) is divided into a first bottom coupling arm portion (320) and a second bottom coupling arm portion (322) which are spaced apart from one another.

\* \* \* \* \*